United States Defensive Publication [19] (H) [11] T104,004 von Rymon Lipinski [43] Mar. 6, 1984

[54] TASTE IMPROVEMENT OF TABLE TOP PREPARATIONS CONTAINING ACESULFAME K

[76] Inventor: Gert-Wolfhard von Rymon Lipinski, c/o Hoechst Aktiengesellschaft P.O. Box 80 03 20, D-6230 Frankfurt am Main 80, Fed. Rep. of Germany

[21] Appl. No.: 528,057

[22] Filed: Aug. 31, 1983

[30] Foreign Application Priority Data

Sep. 3, 1982 [LU] Luxembourg ..... 84363

[51] Int. Cl.[3] ..... A23F 1/236

[52] U.S. Cl. ..... 426/548

[57] ABSTRACT

For special applications modifications of the sweetness intensity or the taste characteristics of the new non-nutritive sweetener Acesulfame K may be required. The taste of Acesulfame K can be modified using mixtures with magnesium sulphate, sodium glutamate, disodium inosinate, disodium guanylate, quinine sulphate, maltol, ethyl maltol, 2.5-dimethyl-3-hydroxy-4-oxo-4.5-dihydrofurane, or thaumatin alone or in suitable combinations, in which Acesulfame K is the main ingredient. These mixtures may be used instead of pure Acesulfame K in the following preparations. For preparing granules, powders, tablets, or solutions Acesulfame K can be mixed with potassium chloride, potassiumdihydrogen phosphate, potassium acetate, potassium hydrogentartrate, disodium hydrogenphosphate, trisodium citrate glucono-δ-lactone, starch syrups of low DE (=Dextrose Equivalent) values, low-viscosity carboxymethyl cellulose, and gumarabic alone or in suitable combinations. A dilution of Acesulfame K to low sweetness intensities is possible using calcium chloride, tricalcium phosphate, calcium lactate, calcium gluconate, potassium hydrogen carbonate, potassium chloride, potassium polyphosphate potassium hydrogen tartrate, sodium chloride, trisodium phosphate, disodium hydrogenphosphate, sodium gluconate, glycin, fumaric acid, citric acid, malic acid, tartaric acid, glucono-δ lacton, glucose, fructose, maltose, lactose, sorbitol, starch syrups having low to medium DE-values, gum arabic, hydrolyzed soluble casein, and soluble gelatin. The taste of the mixtures was rated superior or equivalent to the pure Acesulfame K.

10 Claims, No Sheets Drawing,

13 Pages Specification

The file of this unexamined application may be inspected and copies thereof may be purchased (849 O.G. 1221, Apr. 9, 1968).